United States Patent
Ahn

[11] Patent Number: 6,159,768
[45] Date of Patent: Dec. 12, 2000

[54] ARRAY TYPE MULTI-CHIP DEVICE AND FABRICATION METHOD THEREFOR

[75] Inventor: Byeung-Joon Ahn, Seoul, Rep. of Korea

[73] Assignee: Ceratech Corporation, Rep. of Korea

[21] Appl. No.: 09/314,383

[22] Filed: May 19, 1999

[30] Foreign Application Priority Data

Nov. 2, 1998 [KR] Rep. of Korea ............... 98/46807

[51] Int. Cl.[7] .................... H01L 21/44; H01L 21/48; H01L 21/50
[52] U.S. Cl. .................... 438/107; 438/109; 438/110; 438/118
[58] Field of Search .................... 438/107, 109, 438/110, 118

[56] References Cited

U.S. PATENT DOCUMENTS 5,107,586  4/1992  Eichelberger et al. .
5,702,984  12/1997  Bertin et al. .
5,869,353  2/1999  Levy et al. .

Primary Examiner—Kevin M. Picardat
Assistant Examiner—D. M. Collins
Attorney, Agent, or Firm—Ostrolenk, Faber, Gerb & Soffen, LLP

[57] ABSTRACT

An array type multi-chip device and a fabrication method therefor form a plurality of devices of the same kind or different kinds into a single chip. The array type multi-chip device includes: an array type sintered body in which a plurality of unit devices are arranged such that internal electrodes of each of the unit devices are exposed at opposite side surfaces of the array type sintered body; glass pastes formed at portions of the side surfaces of the array type sintered body between the internal electrodes of the adjacent unit devices; external electrodes of conductive paste formed to cover the internal electrodes at the surfaces of the sintered body between the adjacent glass pastes and overlapping the glass pastes; and nickel and solder platings formed on surfaces of the external electrodes.

9 Claims, 4 Drawing Sheets

FIG. 5

| TEST ITEM | SAMPLE NUMBER | | | | | | | | | | REMARKS |
|---|---|---|---|---|---|---|---|---|---|---|---|
| (Kgf) | 1 | 2 | 3 | 4 | 5 | 6 | 7 | 8 | 9 | 10 | |
| CONVENTIONAL TYPE | 0.6 | 0.4 | 0.8 | 0.6 | 0.6 | 0.8 | 0.6 | 0.6 | 0.6 | 0.8 | max. 0.8 |
| | 0.6 | 0.8 | 0.6 | 0.8 | 0.6 | 0.8 | 0.8 | 0.6 | 0.8 | 0.8 | min. 0.4 |
| | | | | | | | | | | | avg. 0.68 |
| EMBODIMENT TYPE | 2.0 | 2.6 | 2.2 | 2.0 | 2.4 | 2.8 | 2.2 | 2.4 | 1.8 | 2.0 | max. 2.8 |
| | 2.0 | 2.0 | 2.2 | 2.0 | 2.4 | 2.2 | 2.0 | 2.8 | 2.6 | 2.4 | min. 1.8 |
| | | | | | | | | | | | avg. 2.25 |

ARRAY TYPE MULTI-CHIP DEVICE AND FABRICATION METHOD THEREFOR

BACKGROUND OF THE INVENTION

1. Field of the Invention

The present invention relates to an array type multi-chip device in which a plurality of unit devices are arranged in an array and formed into a single composite chip, and more particularly to a fabrication method for forming external connection terminals thereof.

2. Description of the Conventional Art

Since electronic apparatuses have become miniaturized and intelligent, an array type multi-chip device has been commercialized. The array type multi-chip device is a multi-chip array type electronic component which is mounted on a substrate, in which at least two units of the same kind or different kinds of electronic components, such as a chip capacitor, a chip resistor, a chip inductor, a chip varistor, a chip bead, etc., are formed into a single composite device. According to the present invention, there is provided a surface-mounted array type multi-chip device which can be mounted in a miniaturized electronic apparatus and a fabrication method thereof, and in particular there is provided a fabrication method for an improved external connection terminal of the electronic apparatus.

First, to explain an example of a fabrication method for a conventional electronic component (a unit device), an electronic component device is fabricated in a well-known method as shown in FIG. 1A which illustrates a chip varistor. As shown therein, the chip varistor 10 is formed by alternately depositing multi-layer varistor members 11 and multi-layer internal electrodes 12 and then sintering the resultant structure, wherein parts of the internal electrodes 12 are exposed at one side surface of the chip varistor 10 and the other parts thereof are exposed at the opposite side surface of the chip varistor 10.

Next, as shown in FIG. 1B, external electrodes 13 are respectively formed at the both side surfaces of the chip varistor 10, that is, in contact with the exposed portions of the internal electrodes 12. The external electrodes 13 are formed by forming silver (Ag), palladium (Pd) or Ag—Pd powder into a paste, applying the paste to both side surfaces of the chip varistor 10 to cover the internal electrodes 12, drying the resultant structure at a temperature of 200° under atmospheric pressure for about 15 minutes and then sintering the same at a temperature of 800° for about 10 minutes.

As shown in FIG. 1C, nickel 14 is plated on outer surfaces of the external electrodes 13 and then a solder layer 15 formed of lead (Pb), tin (Sn) or Pb—Sn alloy is plated on the nickel 14.

A next example is illustrated for a case where a composite chip array type electronic component for which the electronic components which are fabricated as shown in FIGS. 1A through 1C, that is, various unit devices of the same kind or different kinds, are fabricated into a single chip.

In FIG. 2A, a plurality of unit devices 10 as shown in FIG. 1A, for example, four unit devices 10 are provided and arranged in an array and the array type unit devices 10 are sintered, thereby forming a single chip array sintered body 20. Accordingly, internal electrode groups 21a are exposed in as many as the number of the unit devices 10 at each of both side surfaces of the chip array sintered body 20. Here, each internal electrode group 21a is the plurality of internal electrodes 21 that each unit device 10 has.

Next, as shown in FIG. 2B, pastes 22 are applied on the internal electrode groups 21a and the resultant structure is sintered, thereby forming a plurality of external electrodes 22, the paste 22 being formed of a conductive material such as Ag, Pd or Ag—Pd. Next, as shown in FIG. 2C, nickel is plated on the external electrodes 22 and then a solder layer 23 formed of Pb, Sn or Pb—Sn alloy is plated on the nickel by electroplating or electroless plating.

However, the conventional fabrication method for the multi-chip device has the following problems. Specifically, in the process of plating the nickel and the solder layer onto the external electrodes, the plated film must be formed on the external electrodes 22. But, since surface resistance of the device (the sintered body) such as a chip inductor, a chip varistor, a chip LC filter, a chip bead or a chip capacitor is low and a structure thereof is finely formed, over-plating occurs, such that a surface of the chip is partially plated. Such an over plating definitely leads to shorting between neighboring terminals since the distance between the adjacent external electrodes 22 is considerably small.

Also, since the plating solution sticks to the surface of the chip device due to the over plating and thus penetrates into the chip, the electrical characteristics of the device can be changed which results in deterioration of the reliability of the device.

Further, since in the process for plating the surfaces of the external electrodes the plating solution which penetrates into the contact portions between the sintered body and the external electrodes reacts at the surface of the sintered body, thereby dissolving the surface of the sintered body, the contact surfaces between the external electrodes and the sintered body have excitation, thereby reducing the tensile strength of the external electrodes.

In addition, since the device and the external electrodes have low tensile strength, after being mounted on an electronic circuit substrate, the external terminals of the conventional multi-chip device slip off from the substrate, which results in poor electric contact between the circuit substrate and the electronic component.

SUMMARY OF THE INVENTION

Accordingly, the present invention is directed to an array type multi-chip device and a fabrication method therefor which obviate the problems and disadvantages encountered in the conventional art.

An object of the present invention is to provide an array type multi-chip device and a fabrication method therefor that prevents shorting between terminals due to over-plating, thereby improving reliability of the device.

Another object of the present invention is to provide an array type multi-chip device and a fabrication method therefor in which tensile strength of external electrodes thereof is high.

Still another object of the present invention is to provide an array type multi-chip device and a fabrication method therefor that minimizes an area where a sintered body directly contacts external electrodes thereof for thereby avoiding a problem in that tensile strength of the external electrodes is decreased when a plating solution penetrates into contact portions between the sintered body and the external electrodes in an external electrode plating process.

To achieve these and other objects and advantages and in accordance with the purpose of the present invention, as embodied and broadly described herein, there is provided an array type multi-chip device, which includes: an array type sintered body in which a plurality of unit devices are arranged such that internal electrodes of each of the unit devices are exposed at opposite side surfaces of the array type sintered body; glass pastes formed at portions of the side surfaces of the array type sintered body between internal electrodes of the adjacent unit devices; and conductive paste external electrodes which are formed to cover the internal electrodes of the surface of the sintered body between the adjacent glass pastes and overlap the glass pastes.

Also, to achieve the objects of the present invention, there is provided a fabrication method for an array type multi-chip device, which includes: forming an array type sintered body in which a plurality of unit devices are arranged such that internal electrodes of each of the unit devices are exposed at opposite side surfaces of the array type sintered body; applying glass pastes to portions of the side surfaces of the array type sintered body between the internal electrodes of the adjacent unit devices, the glass pastes having high surface resistance compared with that of the sintered body and having high tensile strength with the sintered body compared to a material of the external electrodes and sintering the glass pastes; and applying conductive pastes to the internal electrodes formed between the glass pastes, such that the conductive pastes overlap the glass pastes; and plating nickel a solder layer on surfaces of the conductive paste external electrodes.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 5 is a table showing a comparison between tensile strength of an external electrode of an array type multi-chip device according to the present invention and that of a conventional multi-chip device.

DETAILED DESCRIPTION OF THE INVENTION

Reference will now be made in detail to the preferred embodiments of the present invention, examples of which are illustrated in the accompanying drawings.

Figure 1A:
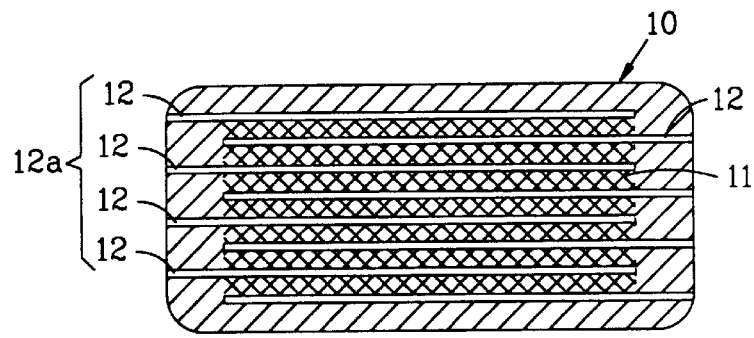
FIGS. 1A through 1C are cross-sectional views sequentially illustrating a fabrication method of a conventional chip varistor.
Figure 1B:
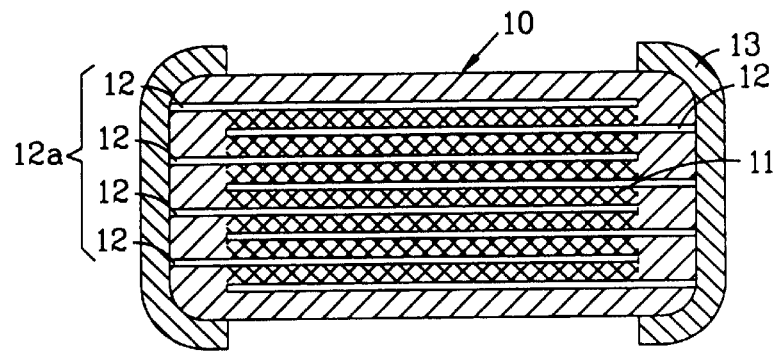
Figure 1C:
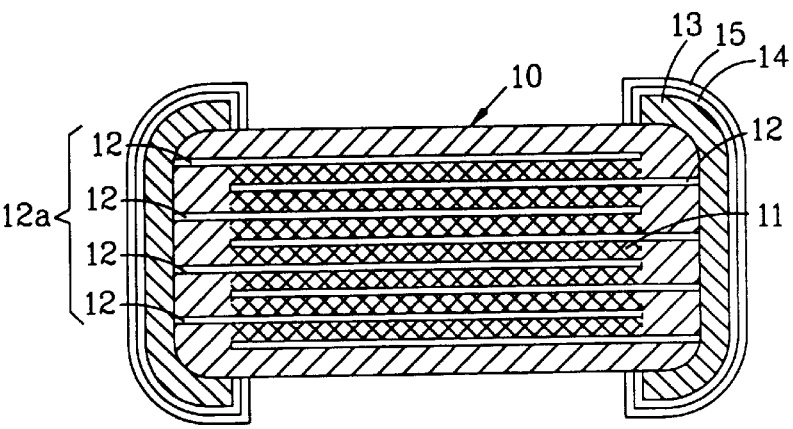
Figure 2A:
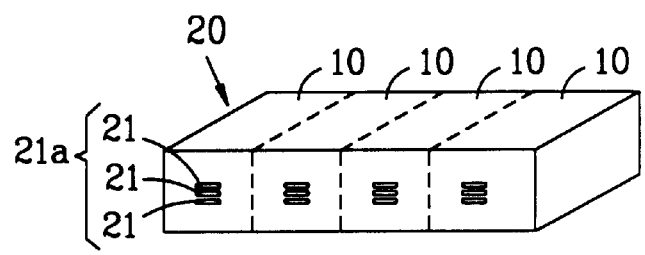
FIGS. 2A through 2C are perspective views sequentially illustrating a fabrication method of a conventional multi-chip varistor.
Figure 2B:
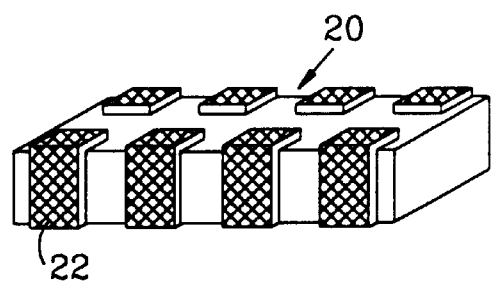
Figure 2C:
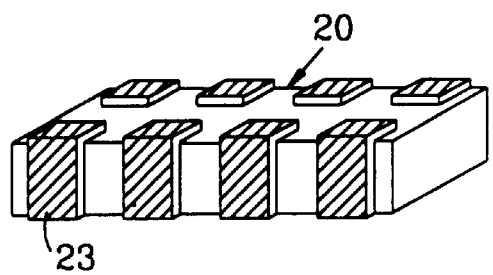
Figure 3:
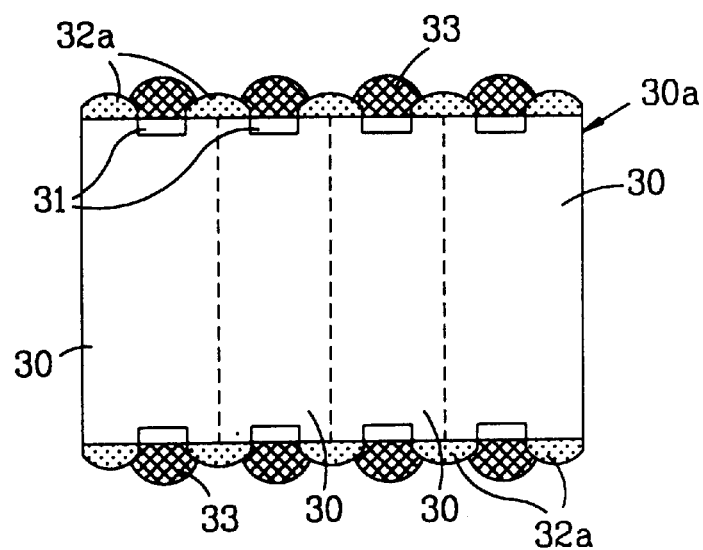
FIG. 3 is a plan view illustrating an array type multi-chip device according to the present invention.

FIG. 3 is a plan view illustrating an array type multi-chip device according to the present invention. As shown therein, a plurality of internal electrodes 31 are exposed at opposite side surfaces of a sintered body 30a in which a plurality of unit devices 30 are formed and sintered as a single body. Sintered glass pastes 32a are respectively formed at surface portions of the sintered body 30a between the internal electrodes 31 of the adjacent unit devices 30, and conductive pastes 33 are applied to cover the internal electrodes 31 formed between the sintered glass pastes 32a, the conductive pastes 33 being formed of Ag, Pd or Ag—Pd. Here, the conductive pastes 33 which correspond to external electrodes overlap the outer surfaces of the glass pastes 32a. Thus, the tensile strength of the external electrodes is reinforced by the strong tensile strength of the overlapping portions of the external electrodes 33 over the sintered glass pastes 32a and also direct contact between the external electrodes 33 and the sintered body is minimized. In other words, the external electrodes 33 are in contact with the glass pastes 32a only at the both side surfaces of the array type sintered body 30a and in direct contact with the sintered body 30a at top and bottom surfaces thereof. Accordingly, the array type multi-chip device according to the present invention can avoid the problem in the conventional art, in that a plating solution soaks through contact surfaces between the external electrodes 33 and the sintered body 30a and thus reacts with the sintered body 30a, thereby eroding the sintered body 30a and thus generating excitation of the external electrodes 33 at the contact surface portions between the external electrodes 33 and the sintered body 30a, which results in an increase in the tensile strength of the external electrodes 33.

Referring to FIGS. 4A through 4E, the fabrication of the array type multi-chip device shown in FIG. 3 according to a preferred embodiment of the present invention will now be described. Here, although a multi-chip varistor array is taken as an example among various electronic possible components according to the embodiment of the present invention shown in FIGS. 4A through 4E, the present invention is not limited to the chip varistor array but can be applied to other electronic components. Also, the present invention is not limited to a multi-chip array configured with electronic components of the same kind, but can be applied to a composite-chip array in which electronic components of different kinds are formed into a single unit. Here, it is noted that a multi-chip device may include unit devices such as chip varistors, chip capacitors, chip beads, chip LC filters, chip inductors, chip resistors, etc.

Figure 4A:
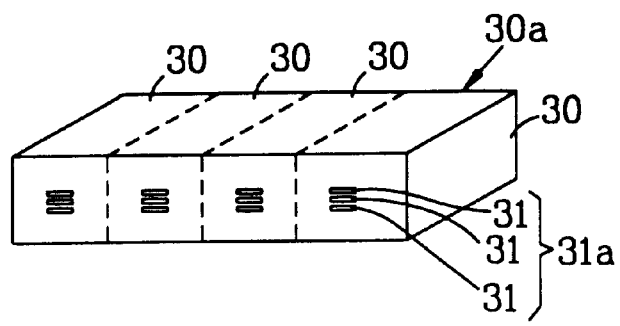
FIGS. 4A through 4E are perspective views sequentially illustrating a fabrication method for an array type multi-chip device according to the present invention.

First, as shown in FIG. 4A, at least two electronic components as described above with reference to FIG. 3, that is the chip varistors 30 are arranged in an array, and sintered as a single unit, so that the sintered body 30a is formed, the sintered body 30a having the plurality of internal electrodes 31 exposed at the opposite side surfaces of the sintered body 30a. FIG. 4A illustrates a structure wherein four chip varistors 30 are sintered as a single unit and which has four internal terminal groups 31a. Here, each internal terminal group 31a has the plurality of internal electrodes 31 that each unit device 30 has.

Figure 4B:
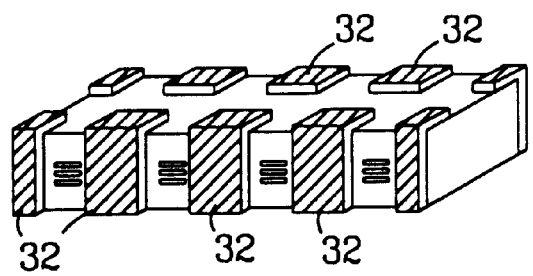

In FIG. 4B, the glass pastes 32, each having a predetermined width, are coated to portions of the surface of the sintered body 30a formed between the internal terminal groups 31a of the adjacent unit devices 30, the glass pastes 32 being composed of PbO (0–30 wt %), ZnO (0–15 wt %), $Al_2O_3$ (10–50 wt %), $B_2O_3$ (15–30 wt %) and $SiO_2$ (10–30 wt %). Here, it is desirable that the glass pastes 32 are formed of a material having a high surface resistance compared with surface resistance of the devices (the sintered body), because the over-plating can be thereby prevented in a following process for plating the external electrodes by which the material having the high surface resistance is applied. In addition, it is also desirable to have the glass pastes 32 be formed of a material which has a high tensile strength with the external electrodes in order to increase the tensile strength of the external electrodes.

Figure 4C:
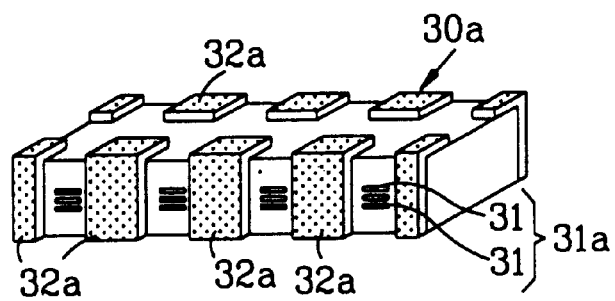

FIG. 4C illustrates that the sintered body 30a is sintered and heated at a temperature of 500–1000° C. for 1–4 hours, for thereby sintering the glass pastes 32 and thus forming the sintered glass pastes 32a.

Figure 4D:
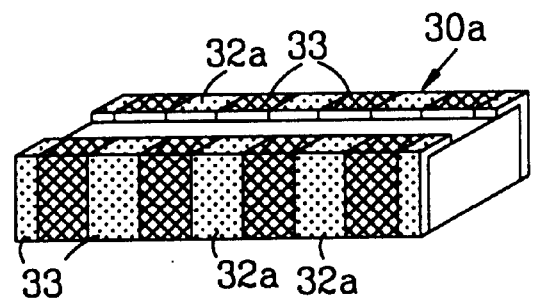

In FIG. 4D, the conductive pastes 33 formed of Ag, Pd or Ag—Pd are applied to cover the predetermined portions of the surface of the sintered body 30a and exposed portions of the internal electrode 31, that is the portions between the adjacent sintered glass pastes 32a. Here, as explained with reference to FIG. 3, the conductive pastes 33 are applied between the sintered glass pastes 32a which are adjacent to each other, the conductive pastes 33 overlapping the sintered glass pastes 32a at the portions where the conductive pastes 33 are in direct contact with the sintered glass pastes 32a. Thus, the both side surfaces of the array type sintered body 30a are not externally exposed.

Figure 4E:
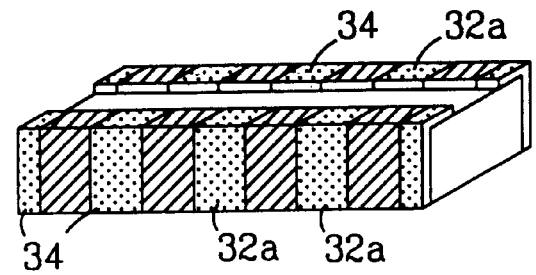

FIG. 4E illustrates that the conductive pastes 33 are dried and then sintered at temperatures of 400–800° C. for 1–4 hours, thereby forming the external electrodes 33. Nickel platings are formed on the surfaces of the external electrodes 33 and solder platings 34 are applied to the surfaces of the nickel platings, thereby completing the fabrication of the external electrodes, the solder platings 34 being formed of Pb, Sn or Pb—Sn alloy. The nickel or Sn plating may be implemented by electroplating or electroless plating. Here, in the plating process, since the sintered glass pastes 32a have a high surface resistance compared with the devices (the sintered body), no over-plating occurs and the plating can only be applied to the surfaces of the external electrodes 33 so that the problem of shorting between the neighboring terminals due to the over-plating which occurs in the conventional art can be avoided. In addition, the conventional art has the problem in that the plating solution reacts with the sintered body at the portions where the external electrodes are direct contact with the sintered body and accordingly the surface of the sintered body is eroded. However, the fabrication method for the array type multi-chip device according to the present invention minimizes the area where the external electrodes are in direct contact with the sintered body, thereby controlling the erosion of the sintered body due to the plating solution, which results in an increase in the tensile strength of the external terminals. Further, with reference to FIGS. 4A through 4E, the fabrication method for the array type multi-chip device according to the present invention was described above, taking the multi-chip varistor array as the example. However, such a method can be applied to the fabrication of an external terminal of a multi-chip bead array, a multi-chip capacitor array, a chip LC filter array or a chip inductor array and also can be applied to the fabrication of a composite chip electronic device in which electronic components of different kinds are arranged in an array. Also, as described above and as illustrated in the Figures, the unit devices in the present invention are directly contacted and attached to each other without a connection medium being used therebetween.

FIG. 5 is a table showing a comparison between the tensile strength of the external electrode of a chip varistor array fabricated according to the present invention and that of the conventional chip varistor array. Here, the "tensile strength" of the external electrode means the force required to remove the external electrode from the multi-chip device. As can be seen from FIG. 5, the tensile strength of the external electrode of the chip varistor array according to the present invention is 3.5 to 4.5 times as great as that for the conventional chip varistor array.

As described above, the array type multi-chip device and the fabrication method therefor according to the present invention have an effect of increasing the tensile strength of the external electrodes by employing the glass material which can be strongly bonded to the external electrodes and which has high surface resistance and is electrically stable, between the internal electrodes of each unit chip (device), before forming the external electrodes, and solves the problem of the erosion of the sintered body due to the plating solution in the plating process of the external electrodes by which the marginal portions of the external electrodes are in contact with the glass material, without being in direct contact with the sintered body as in the conventional art. Further, the array type multi-chip device and the fabrication method of the present invention have an effect of improving the reliability of the device by avoiding the shorting between the neighboring terminals by preventing the over-plating onto the surface of the device during the external electrode plating by applying glass onto the surface portions of the device between the neighboring internal electrodes.

It will be apparent to those skilled in the art that various modifications and variations can be made in the array type multi-chip device and the fabrication thereof of the present invention without departing from the spirit or scope of the invention. Thus, it is intended that the present invention cover the modifications and variations of this invention provided they come within the scope of the appended claims and their equivalents.

What is claimed is:

1. A fabrication method for an array type multi-chip device in which at least two unit devices are formed into a single composite device, comprising the steps of:

forming an array type sintered body in which a plurality of unit devices are adjacently arranged, wherein the unit devices are directly contacted and attached to each other without a connection medium and internal electrodes of each of the unit devices are exposed at opposite side surfaces of the array type sintered body;

applying glass pastes to portions of the side surfaces of the array type sintered body between the internal electrodes of the adjacent unit devices, the glass pastes having a high surface resistance compared with that of the sintered body for increasing tensile strength with a material of external electrodes which are to be formed in a following process;

sintering the glass pastes;

applying conductive pastes on the internal electrodes formed between the glass pastes;

sintering the conductive pastes, thereby forming the external electrodes;

plating nickel on surfaces of the external electrodes; and applying a solder material to surfaces of the nickel plating.

2. The fabrication method for the array type multi-chip device according to claim 1, wherein in the step of applying the conductive pastes, the conductive pastes are applied to overlap the glass pastes.

3. The fabrication method for the array type multi-chip device according to claim 2, wherein in the step of forming the array type sintered body, a plurality of devices of the same kind having an identical function are formed into a single body.

4. The fabrication method for the array type multi-chip device according to claim 2, wherein, in the step of forming the array type sintered body, a plurality of devices of different kinds having different functions from each other are formed into a single body.

5. The fabrication method for the array type multi-chip device according to claim 3, wherein the devices are ones of chip varistors, chip capacitors, chip beads, chip LC filters, chip inductors and chip resistors.

6. The fabrication method for the array type multi-chip device according to claim 4, wherein at least one of the devices is a chip varistor, a chip capacitor, a chip bead, a chip LC filter, a chip inductor or a chip resistor.

7. The fabrication method for the array type multi-chip device according to claim 2, wherein the glass pastes are composed of PbO (0–30 wt %), ZnO (0–15 wt %), $Al_2O_3$ (10–50 wt %), $B_2O_3$ (15–30 wt %) and $SiO_2$ (10–30 wt %).

8. The fabrication method for the array type multi-chip device according to claim 7, wherein the glass pastes are sintered at a temperature of 500–1000° C. for 1–4 hours.

9. The fabrication method for the array type multi-chip device according to claim 7, wherein the glass pastes are sintered at a temperature of 400–800° C. for 1–4 hours.

* * * * *